United States Patent [11] 3,582,898

[72] Inventor Christopher Archibald Gordon Le May
Isleworth, England
[21] Appl. No. 692,522
[22] Filed Dec. 21, 1967
[45] Patented June 1, 1971
[73] Assignee Electric & Musical Industries Limited
Hayes, England
[32] Priority Dec. 30, 1966
[33] Great Britain
[31] 58,310/66

[54] PATTERN RECOGNITION DEVICES

5 Claims, 1 Drawing Fig.

[52] U.S. Cl. 340/172.5
[51] Int. Cl. G06f 7/00
[50] Field of Search 340/172.5; 235/157; 172.5; 146.3

[56] References Cited

UNITED STATES PATENTS

| | | | |
|---|---|---|---|
| 3,333,248 | 7/1967 | Greenberg et al. | 340/172.5 |
| 3,440,617 | 4/1969 | Lesti | 340/172.5 |
| 3,484,746 | 12/1969 | Fralick et al. | 340/146.3 |
| 3,309,674 | 3/1967 | Lemay | 340/172.5 |
| 3,384,875 | 5/1968 | Bene et al. | 340/172.5 |
| 3,391,392 | 7/1968 | Doyle | 340/172.5 |
| 3,394,352 | 7/1968 | Wernikoff et al. | 340/172.5 |

*Primary Examiner*—Paul J. Henon
*Assistant Examiner*—R. F. Chapuran
*Attorney*—William W. Downing, Jr.

ABSTRACT: The present invention relates to pattern recognition devices, that is to say devices, which in response to an applied representation of an unknown pattern, for example, in the form of a plurality of binary digits, produce an output signal representing the identity of a known pattern most clearly resembling the unknown pattern.

One difficulty which is encountered in pattern recognition arises from the fact that the representation may be derived from, for example, printed characters or other patterns which have suffered translation, rotation or even change of size in relation to other such characters, with the result that the device has to be capable of recognizing the same character or pattern with different values of such parameters and this can lead to an undesirable increase in the storage required in the pattern recognition device.

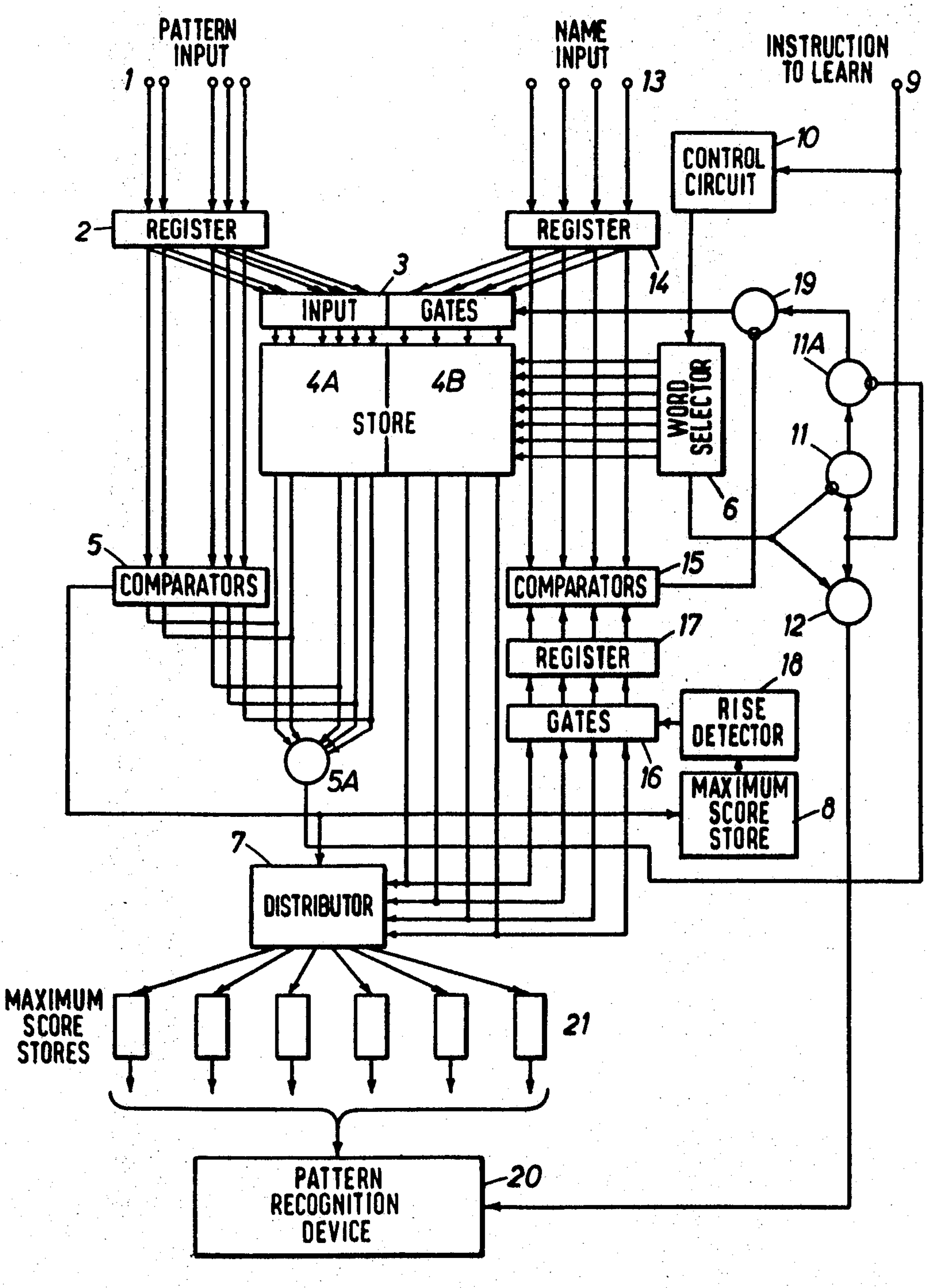
PATTERN INPUT
NAME INPUT
INSTRUCTION TO LEARN
CONTROL CIRCUIT
REGISTER
REGISTER
INPUT
GATES
STORE
4A
4B
WORD SELECTOR
COMPARATORS
COMPARATORS
REGISTER
GATES
RISE DETECTOR
MAXIMUM SCORE STORE
DISTRIBUTOR
MAXIMUM SCORE STORES
PATTERN RECOGNITION DEVICE

PATTERN RECOGNITION DEVICES

It is an object of the present invention to provide a pattern recognition device in which the above difficulty is substantially reduced.

According to the present invention there is provided a pattern recognition device including means for transforming an input signal related to a pattern to be recognized to provide a transformed signal, and means responsive to said transformed signal for deriving the most likely identity of said pattern to be recognized, wherein said transforming means includes,

*a.* input terminals for said input signal,

*b.* storage means conditioned to store groups of representations of known patterns, each group being formed of representations of a respective known pattern with different values of at least one parameter of the known patterns,

*c.* means for comparing said input signal with each of said representations to produce similarity signals indicating the degrees of similarity therebetween,

*d* means for selecting a similarity signal of an extreme value for each group of representations, and

*e.* means for assembling the similarity signals of extreme values so as to provide said transformed signal, whereby said transformed signal is substantially less dependent upon said at least one parameter of said pattern to be recognized than said input signal.

It is to be understood that the phrase "a similarity signal of an extreme value" means either the maximum or minimum similarity signal.

In order that the invention may be fully understood and readily carried into effect it will now be described with reference to the single figure of the accompanying drawing which shows in diagrammatic form one example of the present invention.

Referring to the drawing, a representation of a pattern to be recognized in the form of a plurality of binary digits is applied to the terminals 1 from which it is entered in a register 2. The binary coded representation may be derived from any means well known in the art such as a pickup tube scanning the pattern to be recognized and with appropriate circuits for producing a binary coded representation of the scene viewed. Input terminals for just five digits are shown for convenience. The representation stored in the register 2 is applied by input gates 3 to the part 4A of the store 4 and also directly to comparators 5. The output signals from the part 4A of the store 4 are also applied to the comparators 5 and to an OR gate 5A of threshold "1" and type well known in the art. The store 4 has a plurality of addresses which are selected by means of a selector 6, and at each address there are two registers one in part 4A and one in part 4B of the store 4, and which are addressed simultaneously in response to the selection of a given address by selector 6. Moreover, the store 4 is such that in response to signals from the selector 6 of the registers in both parts of the store are read nondestructively unless signals are applied to the store 4 via the gates 3 when the contents of the registers addressed are changed in accordance with the signals from the gates 3. Store 4 may be of any known form such as a thin magnetic film type producing a continuous output and formed of elements such as are disclosed in British Pat. No. 975,016. Instead of reading the store 4 nondestructively a regenerative read-write system may be used.

Each of comparators 5 comprises an equality gate of the type well known in the art, and compares a respective binary digit of the representation stored in register 2 with the corresponding digit of the output signal from section 4A of the store 4. The output of the comparators 5 is referred to as a similarity signal and represents the number of digits of the representation stored in the register 2 which are the same as those of the word selected from the section 4A of the store 4 by the selector 6, and this output is applied to a distributor 7 and also to a store 8 which stores the largest number applied to it and is insensitive to smaller numbers. Store 8 is referred to as a "maximum score store" and is thus a peak detector. The number stored in such a store is referred to as the "maximum score." To this end such a store can be constituted by a peak detector as described in pages 503 to 506 of "Waveforms," No. 19 of the M.I.T. Radiation Laboratory Series.

As the device described is adaptive it is capable of undergoing a "learning" operation in response to an "instruction to learn" signal applied by an operator to a terminal 9 from which the signal is passed to a control circuit 10 and to gates 11 and 12 both of threshold "2" and of known type, gate 11 being an inhibit gate. During learning the identity or name of an input pattern which may for example be a blood cell or a numerical or alphabetic character is applied in binary coded digital form to the name input terminals 13 from which it is applied for storage in the register 14. In this example it is assumed that the signal applied to terminals 13 and thence to register 14 is in the form of a 4-bit code, there being a respective terminal and input lead to register 14 for each digit. The name in the register 14 is entered via input gates 3 into section 4B of the store 4 and is also applied to one set of inputs of comparators 15 each digit being passed to a respective one of comparators 15. The name read from the part 4B of the store 4 under the control of the word selector 6 is applied to the distributor 7 and also via gates 16 to a register 17.

The gates 16 are opened in response to an output from a rise detector 18 which responds to increases in the maximum score stored in the store 8. Rise detector 18 produces an output signal if the number signal in store 8 increases, and is thus a differentiating circuit with means of known kind to cause it to produce an output only in response to an increase in the input signal. To this end such a differentiating circuit may be constituted by the circuit shown on page 39 of "Pulse & Digital Circuits" by Millman and Taub. The name stored in the register 17 is applied to the other inputs of the comparators 15 each digit of the name stored in register 17 being passed to a respective one of comparators 15. When the names in registers 14 and 17 are the same, and each one of comparators 15 accordingly detects equality of inputs, an output is applied to inhibit signals applied to the other terminal of an inhibit gate 19 of threshold "2" and of known type. Each of comparators 15 comprises an equality gate of the type well known in the art and compares a respective digit of the name stored in register 17 with the corresponding digit of the name stored in register 14. When able to pass signals the gate 19 may pass a signal to open the input gates 3 in response to an "instruction to learn" signal applied to the terminal 9 and fed via the gates 11 and 11A. The gate 11A is an inhibit gate of threshold "2" again of known type and is disabled from passing the "instruction to learn" signal by a signal from gate 5A indicating that information is already stored at the address selected. The control circuit 10 controls the operation of the word selector 6, and when all addresses of the store 4 have been filled the selector 6 produces an output signal closing the gate 11 and enabling the "instruction to learn" signal to pass through the gate 12 to a main pattern recognition device 20.

Distributor 7 comprises a commutator of the type well known in the art and is controlled by means of name information from part 4B of store 4 in such a way that each similarity signal produced by the comparators 5 as a result of the comparison of a representation in register 2 with a representation in part 4A is distributed to that one of stores 21 which corresponds to the name of the representation in part 4A which is stored at the same address in part 4B. Each of stores 21 corresponds to a respective name and is similar to store 8, and will thus be referred to as a "maximum score store." The combination of maximum scores stored in the stores 21, or a quantized version of those scores, forms the transformed input signal for the pattern recognition device 20, each maximum score representing the greatest degree of similarity between an input pattern and the corresponding name.

Consider first the operation of the arrangement shown in the figure, after the store 4 has been filled with representations of patterns and corresponding names. The store 4 stores at each address in parts 4A and 4B a representation of a pattern and the corresponding name for that pattern respectively. A representation of an input pattern stored in the register 2 is applied continuously to the comparators 5, the gates 3 being closed except during learning as will be described subsequently. Meanwhile the word selector 6 under the control of control circuit 10 operates to select successively all the addresses of the store 4 so that the stored representations of patterns in the part 4A of the store 4 are applied successively to the comparators 5. As explained above the comparators 5 produce a similarity signal representing the number of digits of the representation stored in the register 2 which are the same as those of the representation read from the selected address of the part 4A of the store 4, and this signal, which may for example be in binary coded form, is applied to the distributor 7. The distributor 7, under the control of the name read from the part 4B of the store 4 at the address selected by the selector 6, applies each similarity signal from the comparators 5 to that one of the maximum score stores 21 corresponding to associated name in response to name information from part 4B of store 4''. After all of the addresses of the store 4 have been selected by the selector 6, each of the stores 21 stores the score representing the number of digits of the representation of the input pattern which are the same as those of the most similar representation stored in the part 4A of the store 4 having associated with it at the same address in the part 4B of the store the name allocated to the particular one of the stores 21.

The representations stored in the part 4A of the store 4 fall into a number of groups and the representations in each group have the same name. In a group however, the representations differ from one another in that they are representations of the same pattern which has undergone a change in one or more parameters such as a translation from left to right, a translation up or down, a rotation or a change of size for example.

Suppose for example, one group of representations represent the letter A in a plurality of different positions arranged from left to right within the sensing area from which the representations are derived. Each one of this group of representations would have associated with them in the part 4B of the store 4 the name indicating that the identity of the pattern is the letter A. Suppose now that a representation of an unknown input pattern is applied to the terminals 1, which representation is in fact derived from a letter A offset to one side of the center of the sensing area. Then as the selector 6 successively selects the addresses of the store 4 so a representation which closely corresponds to the applied representation will be derived from the part 4A at some address, and the comparators 5 will produce an output signal corresponding to a relatively high score which will be directed by the distributor 7 to that one of the stores 21 which corresponds to the letter A. The other representations of the letter A in other positions will produce lower scores which although also directed to the same store 21 will not be entered because they all lie below the maximum score obtained by that representation which best fitted the representation of the unknown pattern most closely. It will thus be evident that for an input pattern corresponding exactly to a pattern stored in the store 4 the arrangement described will produce output signals which are substantially independent of the position of the unknown pattern.

Consider now the case when the input pattern does not exactly correspond with one of the patterns stored in the store 4, for example if the input representation is derived from a letter B again offset to one side of the center of the sensing area. As before the group of representations of the letter A in different positions are applied successively to the comparators 5 and the corresponding scores are produced, and although no substantially exact fit will be obtained from any pattern there will be one maximum score corresponding to the best fit of the letter B to the letter A in some translational position. Since the representations in the part 4A of the store 4 correspond to a number of translational positions from left to right of the letter A it will be that whatever the translational positions of the letter B from which the input pattern is derived the maximum score will be substantially unchanged, provided that the representations in part 4A correspond to a sufficiently wide range of translational positions of the letter A. Similar considerations will apply to the other patterns stored in the other parts of 4A of the store 4 so that the combination of maximum scores stored in the stores 21 will be substantially independent of the translational position of the letter B from which the input pattern was produced, subject to the above proviso. Instead of different translational positions from one side to the other for the different patterns stored in the store 4, different translational positions up and down or different rotational positions occupying a complete cycle of rotation could have been chosen, or different sizes. Alternatively or additionally, the part 4A could include representations of the same patterns in white on black as well as in black on white, so that positive or negative forms of applied patterns could be recognized. Pattern recognition device 20 serves to recognize the transformed signal formed by the maximum scores in the stores 21, and to this end may comprise any known arrangement for classifying a given unknown signal by comparison of the transformed signal with each signal in a store of known signals. Thus it may comprise an arrangement similar to the arrangement described to produce the transformed signal, but with a much reduced storage capacity due to the fact that it need only be taught an unknown pattern once.

Considering the device shown in the FIG. excluding the device 20 as the first layer of a multilayer recognition device, a plurality of such layers may be used before device 20 each of which is arranged to compensate for different parameters such as positions or other variations of a pattern. For example, the first layer may be used to compensate for translation from left to right, the second layer may be used to compensate for translation up and down, the third layer may be used to compensate for rotation and a fourth layer may be used to compensate for the variation in size of the patterns. In this way variations in position and size of an unknown pattern may be compensated for, so that the output signal from the fourth layer is substantially invariant with the variations of positions and size, and the final recognition in device 20 can take place with respect to a standard size pattern centrally disposed on the sensing area.

It is now necessary to consider the operation of the apparatus described whilst it is being taught certain known patterns. The representation of a pattern derived from the pattern in a sensing area is applied to the input terminals 1, its name is applied in binary coded form to the terminals 13 and an "instruction to learn" signal is applied to the terminal 9. Under the control of the control circuit 10 the selector 6 selects the addresses of the store 4 in turn and at the first vacant address the output from gate 5A ceases so that gate 11A is opened so that the "instruction to learn" signal can pass through gates 11 (which is kept open until word selector 6 provided a signal to close it when the last address is filled), 11A and 19 (subsequently closed in response to a signal from comparators 15 when the names in registers 14 and 17 are the same) to open the input gates 3 so that the input representation now stored in the register 2 is entered into the first vacant address of the part 4A of the store 4 and the corresponding name into first address of part 4B of the store 4. Once the representation and its name have been entered, output signals are obtained from the part 4A of the store 4 representing the stored representation, which is compared with the representation stored in the register 2, and since these are identical the comparators 5 produce a large output signal corresponding to the full score. This signal is applied to the maximum score store 8 which causes the rise detector 18 to produce an output thus opening the gates 16. The name which has been entered in the first address of the part 4B of the store 4 passes through gates 16 and is entered into the register 17 and then compared in comparators 15 with the name stored in register 14. These names are the same and the comparators 15 produce an output signal which closes the gate 19.

If the first vacant address is the first address, i.e. the start of learning, then no more entries can be inserted in the store 4 from patterns having the same name as that of the first entry. This is because the name in register 17 will always be the same as that in register 14 and learning of a further pattern of the same name will inevitably be inhibited. To effect further entries into the store 4 it is necessary to present to the device representations of another pattern having a different name. After one or more further entries it may be necessary to introduce a representation of a pattern with yet a further name or return to a pattern bearing the first name to effect further entries. This process is continued until all the representations to be learned have been entered in the part 4A of the store 4 and the correct name is produced for each of the patterns.

The part 4A of the store 4 will contain a group of several representations of the same pattern in different positions (say) and these positions must be sufficiently closely spaced to avoid confusion with other patterns. On the other hand, too close a spacing of the positions leads to inefficient utilization of the storage capacity of the store 4. However, the device described only allows an entry in each part of the store 4 if there is confusion with a previously stored representation having a different name. As long as the name in the register 17 is the same as the name of the input pattern stored in the register 14 the comparators 15 produce an output which closes the gate 19 and prevents the entry of the representation and corresponding name into respective parts of the store 4. However, if the spacing of the positions of the pattern from which a group of representations stored in the part 4A of the store 4 are derived is too great, then at some positions of the pattern in the sensing area the name entered in the register 17 will differ from that applied to the terminals 13 and stored in the register 14, because the maximum score will have been recorded by a representation having a different name. When this occurs the output from the comparators 15 ceases and the gates 3 are opened in response to the instruction to learn signal thus allowing the representation of the input pattern and the corresponding name to be entered into respective parts of the store 4 at the first vacant address of the store.

The arrangement allows the learning mode of the device to take place in a semiautomatic manner as described by applying at random input patterns and their corresponding names to the device, each pattern being scanned across the sensing area sufficiently slowly to allow the device to enter such different representations as are required to distinguish the pattern being applied at the time from patterns having other names already stored in the device. Thus when the first pattern is applied only one entry is made as there is no possibility of confusing it with any other pattern. When the second pattern is applied probably two representations need to be stored in the part 4A of the store 4 in order to provide the distinction required. With the third pattern four or five representations will be stored as the pattern is moved across the sensing area and so on. Of course, it is necessary to apply each input pattern several times over to obtain the necessary closeness of spacing of the positions of the pattern of which representations are stored in the part 4A.

Where several layers of translation circuits are provided before the main recognition device, each layer compensating for changes in different parameters, the stores of these layers are taught as described above one after the other, the first layer being taught first, the second second and so on. It will be appreciated that it is essential to exclude from the patterns during the teaching process for a particular layer any translation or distortion which is the subject of compensation provided by a subsequent layer, although translations or distortions compensated by preceding layers can be allowed because these will have no effect. It is preferable, though not essential, to use a different set of patterns for each layer. The signal from the word selector 6 may be used to provide an indication to the operator that all addresses of the store in a layer are full. If desired, the spacing of the positions of the patterns from which the representations are derived may be calculated beforehand and the representations entered in the store 4 by means of conventional write circuits. The device described above with reference to the figure does not include any means required for clearing the registers at the end of each cycle of the word selector 6 and for ensuring the accurate timing of the various operations to be performed. However, all these matters are well within the capability of an engineer skilled in the art and are not described herein. It will, moreover, be appreciated that the store 4 and the associated circuitry may be arranged for the simultaneous comparison of an input pattern with the stored representations in groups, or even with all of the stored representations, so that the operation of the device is more rapid than with the sequential comparison described above.

The device may be modified by arranging that the stores 21 do not store the maximum scores for the patterns of the respective groups but store the minimum of the scores recorded by the different patterns of the respective groups.

In another modification of the device the store 4 is not divided into two parts 4A and 4B and at each address only the representation of the input pattern is stored. However, the addresses of the store are divided into several groups each group being allocated to a pattern of a particular identity and the distributor 7 is controlled by the addresses of the store 4 selected by the selector 6. In this arrangement it will be appreciated that a group of addresses replaces the name information otherwise stored in the part 4B of the store.

It will be appreciated that the invention is not limited to comparison with stored patterns to effect the transformation of the signals, and in another example of the invention the transforming means includes a plurality of correlation networks each producing a similarity signal indicating the degree of similarity of the pattern represented by the input signals of the transforming means to the pattern which the particular correlation network is designed to fit. Any other arrangement which produces similarity signals in response to the input pattern may alternatively be used, the invention lying in the selection of the similarity signal of extreme value from among the similarity signals representing the degree of similarity of the input pattern to the same known pattern, and the transmission of the combination of extreme similarity signals for the the different known patterns as transformed signals to the next layer of the pattern recognition device. Moreover, the invention may be used in devices for recognizing any type of pattern such as, for example, visual patterns speech sounds, operating conditions in a factory process, or weather conditions, the invention serving to reduce the influence of one or more parameters of these patterns to facilitate the recognition process.

What I claim is:

1. A pattern recognition device including means for transforming an input signal related to a pattern to be recognized to provide a transformed signal, and means responsive to said transformed signal for deriving the most likely identity of said pattern to be recognized, wherein said transforming means includes:

a. input terminals for said input signal, b. storage means conditioned to store groups of representations of known patterns, each group being formed of representations of a respective known pattern with different values of at least one parameter of the known patterns, c. means for comparing said input signal with each of said representations to produce similarity signals indicating the degrees of similarity therebetween, d. means for selecting a similarity signal of an extreme value for each group of representations, and e. means for assembling the similarity signals of extreme values so as to provide said transformed signal, whereby said transformed signal is substantially less dependent upon said at least one parameter of said pattern to be recognized than said input signal.

2. A device according to claim 1 wherein each location of said storage means is conditioned to store one of said representations and a signal indicative of the identity of the known pattern from which the representation is derived, said means for assembling said similarity signals of extreme values including separate recording means for each identity and means for applying the similarity signal of an extreme value for each group of representations to the recording means which is respective to the identity of the known patterns from which the representations of the group are derived.

3. A device according to claim 1 including:

a. a plurality of transforming means each having input terminals for an input signal and output terminals for a transformed signal, and b. means connecting the output terminals of a first of said transforming means to the input terminals of a second of said transforming means and so as to connect the transforming means in cascade, wherein c. the storage means of each of said transforming means is conditioned to store groups of representations of known patterns, each group being formed of representations of a respective known pattern with different values of at least one parameter of the known patterns, in which the at least one parameter is respective to the transforming means, and d. said means responsive is responsive to the transformed signal from the output terminals of the last of said transforming means.

4. A device according to claim 1 including:

a. further input terminals for an identity signal representing the identity of a known pattern from which an input signal is derived, and b. means responsive to said input signal derived from a known pattern and its identity signal to enter in a vacant location of the storage means a representation of the known pattern and its identity signal whereby the representations may be entered into the storage means by a teaching process.

5. A device according to claim 4 wherein the means for entering a representation into the storage means includes:

a. means for deriving the representation from the storage means which bears the greatest resemblance to the input signal derived from the known pattern, b. means for comparing the identity of the pattern from which said representation which bears the greatest resemblance is derived with the identity of said known pattern, and c. means for inhibiting an entry into said storage means if said identities are the same.